(12) United States Patent
Matsumoto et al.

(10) Patent No.: US 9,856,939 B2
(45) Date of Patent: Jan. 2, 2018

(54) SHOCK ABSORBER

(71) Applicant: HITACHI AUTOMOTIVE SYSTEMS, LTD., Ibaraki (JP)

(72) Inventors: Hiroyuki Matsumoto, Yamato (JP); Shigeo Katayama, Yokohama (JP); Yohei Katayama, Yokohama (JP); Umi Tanabe, Kawasaki (JP); Yusei Kimura, Yokohama (JP); Yoshie Midorikawa, Yokohama (JP); Hideki Hata, Ota (JP); Osamu Shioume, Kasugai (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/797,900

(22) Filed: Jul. 13, 2015

(65) Prior Publication Data
US 2016/0017951 A1 Jan. 21, 2016

(30) Foreign Application Priority Data

Jul. 16, 2014 (JP) ................................. 2014/146315

(51) Int. Cl.
*F16F 9/32* (2006.01)
*F16F 9/34* (2006.01)
*F16F 9/18* (2006.01)

(52) U.S. Cl.
CPC .............. *F16F 9/3415* (2013.01); *F16F 9/18* (2013.01); *F16F 9/3257* (2013.01)

(58) Field of Classification Search
CPC ........ F16F 9/54; F16F 9/32; F16F 9/46; F16F 9/48; F16F 9/50; F16F 9/18; F16F 9/066; F16F 9/3257; F16F 9/3415
See application file for complete search history.

(56) References Cited

U.S. PATENT DOCUMENTS

| 6,119,829 A * | 9/2000 | Nakadate ................ F16F 9/348 |
| | | 188/266.6 |
| 6,283,259 B1 * | 9/2001 | Nakadate ................ F16F 9/369 |
| | | 188/299.1 |
| 8,469,162 B2 * | 6/2013 | Nishimura ............. B60G 13/06 |
| | | 137/315.03 |
| 2012/0073920 A1 | 3/2012 | Yamasaki et al. |

(Continued)

FOREIGN PATENT DOCUMENTS

JP          2012-72857        4/2012

*Primary Examiner* — Bradley King
(74) *Attorney, Agent, or Firm* — Wenderoth, Lind & Ponack, L.L.P.

(57) ABSTRACT

A shock absorber includes a reservoir between a cylinder and an outer tube, in which hydraulic liquid and gas are sealed; a middle tube between the cylinder and the outer tube; a connecting pipe in the lateral wall of the middle tube, which includes a tip end extending toward the outside of the outer tube; an opening in the outer tube, allowing hydraulic liquid to flow from the outside of the outer tube into the reservoir through the outer side of the connecting pipe; and a partition member in the reservoir, which includes a partition wall that configured to regulate hydraulic liquid's upward flow from the opening in the reservoir. The partition member is made of flexible resin or rubber, provided with a fitting hole, and fitted to the connecting pipe with interference with the connecting pipe inserted through the hole.

10 Claims, 4 Drawing Sheets

(56) References Cited

U.S. PATENT DOCUMENTS

2014/0291086 A1* 10/2014 Suzuki .................... F16F 9/062
   188/269
2014/0291089 A1* 10/2014 Konakai ................... F16F 9/34
   188/314

* cited by examiner

SHOCK ABSORBER

TECHNICAL FIELD

The invention relates to shock absorbers that generate a damping force by controlling the flow of a hydraulic fluid according to the movement of a piston rod.

BACKGROUND ART

Japanese Unexamined Patent Application Publication No. 2012-72857 discloses a damping force-control hydraulic shock absorber with control valves transversely installed, which is provided with a baffle plate (partition member). The baffle plate used in this shock absorber is produced by cure adhesion of a rubber partition member serving as an elastic sealant to a metal plate. It is preferable to improve productivity of shoot absorbers of this type.

SUMMARY

A shock absorber according to one embodiment of the invention is provided to be installed between two relatively displaceable members. The shock absorber includes a cylinder in which a hydraulic fluid is sealed; a piston inserted in the cylinder; a piston rod interconnected to the piston and extending out of the cylinder; an outer tube mounted over an outer circumferential surface of the cylinder; a reservoir formed between the cylinder and the outer tube and in which the hydraulic liquid and gas are sealed; a middle tube mounted between the cylinder and the outer tube; a connecting pipe disposed in a lateral wall of the middle tube and including a tip end extending toward the outside of the outer tube; an opening forced in the outer tube for allowing the hydraulic liquid to flow from the outside of the outer tube into the reservoir through the outer side of the connecting pipe; and a partition member placed within the reservoir. The partition member includes a partition wall that, in a state that the shock absorber is located between the two relatively displaceable members, regulates an upward flow of the hydraulic liquid from the opening to an upper portion of the reservoir. The partition member is made of flexible resin or rubber. The partition member is provided with a fitting hole and fitted to the connecting pipe with interference with the connecting pipe inserted through the fitting hole.

DESCRIPTION OF EMBODIMENTS

Figure 1:
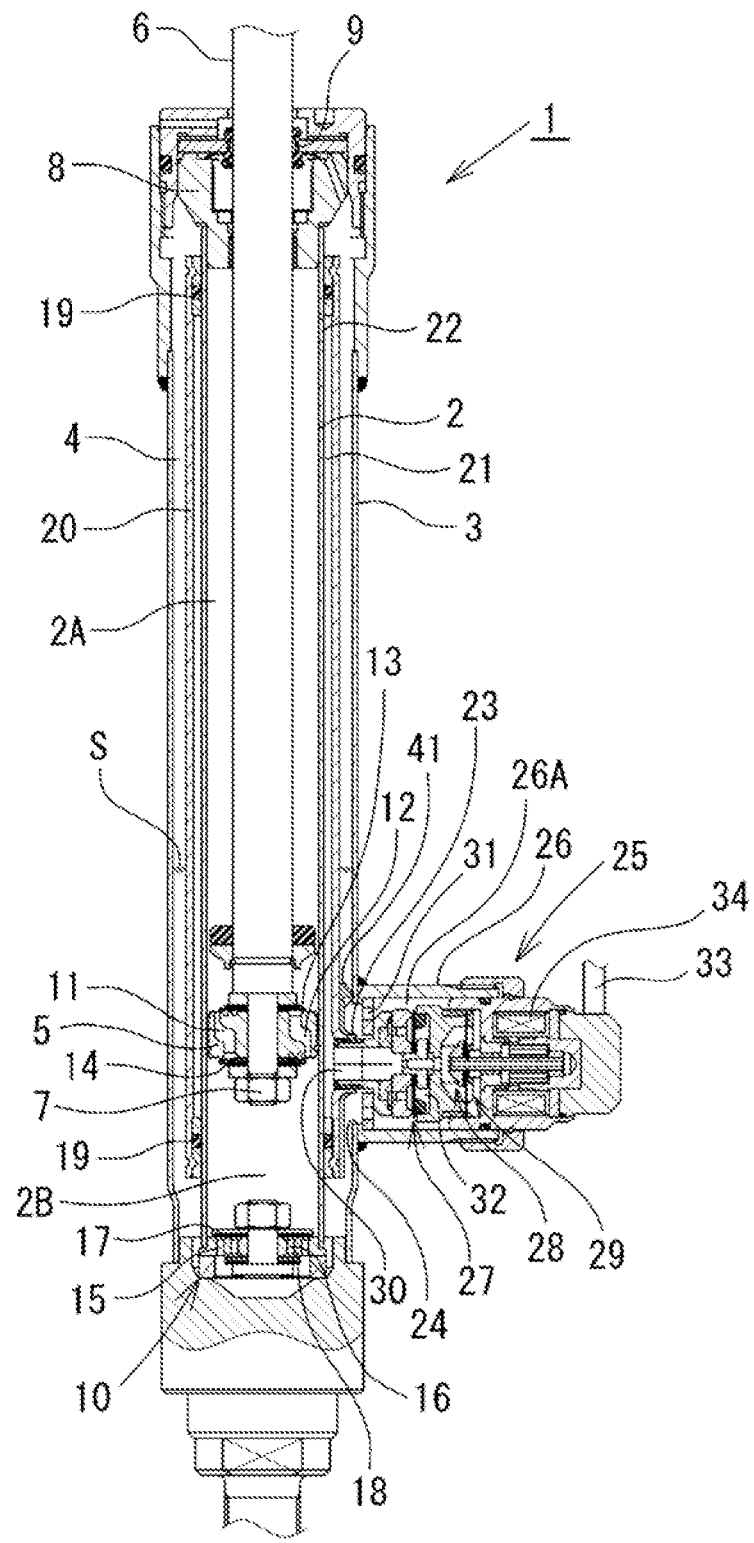
FIG. 1 is a sectional view of a shock absorber according to an embodiment taken along the plane including an axis of the absorber.

A damping force-control hydraulic shock absorber with control valves transversely installed, which is shown in FIG. 1, will be described below as a shock absorber 1 of an embodiment. For convenience, in the following description, the vertical direction or FIG. 1 is defined as that of the shock absorber 1 in its installed position.

As illustrated in FIG. 1, the shock absorber 1 has a multi-cylinder structure in which an outer tube 3 is mounted over an outer circumference of a cylinder 2. An annular reservoir 4 is formed between the cylinder 2 and the outer tube 3. A piston 5 is slidably inserted in the cylinder 2. The interior of the cylinder 2 is divided by the piston 5 into two chambers including a cylinder upper chamber 2A and a cylinder lower chamber 2B. One end of a piston rod 6 is connected to the piston 5 with a nut 7. The other end of the piston rod 6 extends through the cylinder upper chamber 2A, passes through a rod guide 8 and an oil seal 9, which are mounted on an upper end of the cylinder 2 and that of the outer tube 3, and extends out of the cylinder 2.

A base valve 10 is placed at a lower end of the cylinder 2. The base valve 10 separates the cylinder lower chamber 2B and the reservoir 4 from each other. The piston 5 is provided with passages 11 and 12 linking the cylinder upper chamber 2A and the cylinder lower chamber 2B. A check valve 13 is placed in the passage 12. The check valve 13 allows only the flow of a hydraulic liquid from the cylinder lower chamber 2B side to the cylinder upper chamber 2A side. Placed in the passage 11 is a disc valve 14 that is opened when the pressure of the hydraulic liquid in the cylinder upper chamber 2A reaches a given pressure, and thus relieves the hydraulic liquid (pressure) from the cylinder upper chamber 2A side to the cylinder lower chamber 2B side.

The bass valve 10 is provided with passages 15 and 16 linking the cylinder lower chamber 2B and the reservoir 4. A check valve 17 is placed in the passage 15. The check valve 17 allows only the flow of the hydraulic liquid from the reservoir 4 side to the cylinder lower chamber 2B side. Placed in the passage 16 is a disc valve 18 that is opened when the pressure of the hydraulic liquid in the cylinder lower chamber 2B reaches a given pressure, and thus relieves the hydraulic liquid (pressure) from the cylinder lower chamber 2B side to the reservoir 4 side. The hydraulic liquid and gas are sealed in the reservoir 4.

A middle tube 20 is mounted over the outer circumference of the cylinder 2. The middle tube 20 is fitted onto the outer circumference of the cylinder 2 with seal rings 19 intervening therebetween. The seal rings 19 are seated in their respective seal-ring grooves formed in upper and lower end portions of the middle tube 20. An annular passage 21 is formed between the cylinder 2 and the middle tube 20. The annular passage 21 leads to the cylinder upper chamber 2A through a passage 22 formed in a lateral wall of an upper end portion of the cylinder 2. A connecting pipe 23 is disposed in a lateral wall of a lower part of the middle tube 20. The connecting pipe 23 has a tip end extending toward the outside of the outer tube 3 (rightward as viewed in FIG. 1). In a lateral wall of the outer tube 3, an opening 24 is formed substantially coaxially with the connecting pipe 23. A damping force control mechanism 25 is fixed over the opening 24 formed in the lateral wall of the outer tube 3.

The damping force control mechanism 25 includes a cylindrical casing 26 that is attached to the lateral wall of the outer tube 3 so as to encircle the opening 24. Inside the casing 26, there are provided a main valve 27 of a pilot (back-pressure) type and a pilot valve 28. The pilot valve 28 is a solenoid-driven pressure control valve that controls a valve opening pressure of the main valve 27. In the casing 26, a fail-safe valve 29 is placed on the downstream side of the pilot valve 28. The fail-safe valve 29 is activated when there is a failure. An interconnecting pipe 30 is liquid-sealingly inserted in the connecting pipe 23 provided to the middle tube 20. The interconnecting pipe 30 defines an inlet passage of the damping force control mechanism 25. After being introduced from the annular passage 21 into the interconnecting pipe 30, the hydraulic liquid passes through the main valve 27, the pilot valve 28, and the fail-safe valve 29, and then enters a chamber 26A surrounded by the casing 26. The hydraulic liquid in the chamber 26A further passes through a passage 31 formed in an end portion of the casing 26, and the opening 24 of the outer tube 3, and enters the reservoir 4.

Before the main valve 27 is opened, the flow of the hydraulic liquid is controlled by the pilot valve 28 to generate a damping force. While the main valve 27 is open, the damping force is generated chiefly by the main valve 27. The hydraulic liquid present on the upstream side of the pilot valve 28 is partially guided into a back-pressure chamber 32 located at the rear of the main valve 27. Internal pressure of the back-pressure chamber 32 then acts in a direction closing the main valve 27. The damping force is controlled by adjusting the pressure that is controlled by the pilot valve 28 (hereinafter, referred to as a controlled pressure). The controlled pressure of the pilot valve 28 is adjusted by control current that is supplied to a solenoid 34 via a harness 33. The internal pressure of the back-pressure chamber 32 is changed by controlling the controlled pressure of the pilot valve 28 as described, to thereby adjust the valve opening pressure and opening degree of the main valve 27.

The fail-safe valve 29 is closed when the vehicle is stopped at stoplights or current supply to the solenoid 34 is blocked. When the current supply to the solenoid 34 is blocked, the fail-safe valve 29 limits the flow of the hydraulic liquid in place of the pilot valve 28 that is always open. In this manner, the fail-safe valve 29 functions to prevent an excessive decrease of the damping force and retain a proper amount of damping force.

Figure 2:
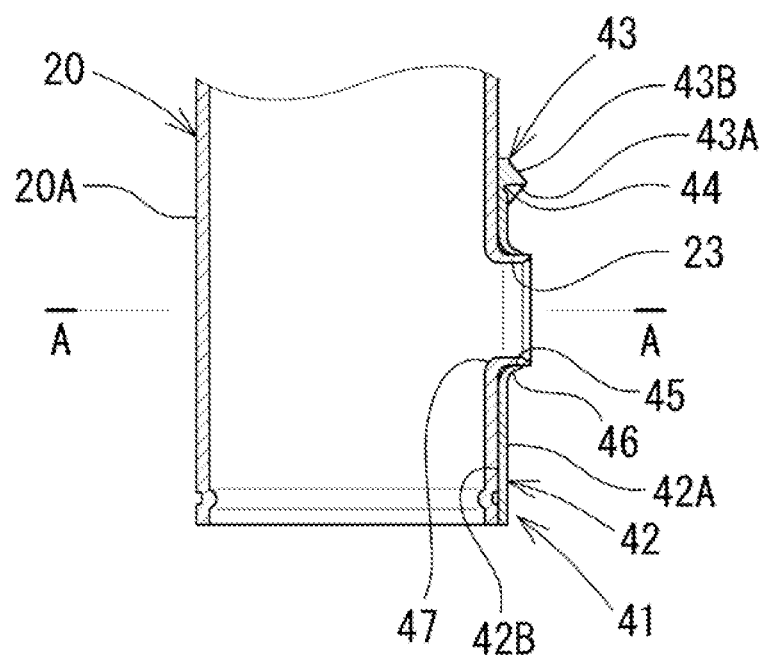
FIG. 2 is an explanatory view of an installation structure of a baffle plate, and is also an enlarged view of the baffle plate shown in FIG. 1 and the vicinity thereof.

In the reservoir 4, a baffle plate 41 (partition member) is situated to face the opening 24 of the outer tube 3. The baffle plate 41 regulates the flow of the hydraulic liquid that flows from the damping force control mechanism 25 through the passage 31 and the opening 24 into the reservoir 4. FIG. 2 explains an installation structure of the baffle plate 41 on the middle tube 20. FIG. 2 is an enlarged view of the lower part of the middle tube 20 and the baffle plats 41, which are shown in FIG. 1. As with the foregoing description referring to FIG. 1, the vertical direction of FIG. 2 is also defined as that of the baffle plate 41 in its installed state.

Figure 4:
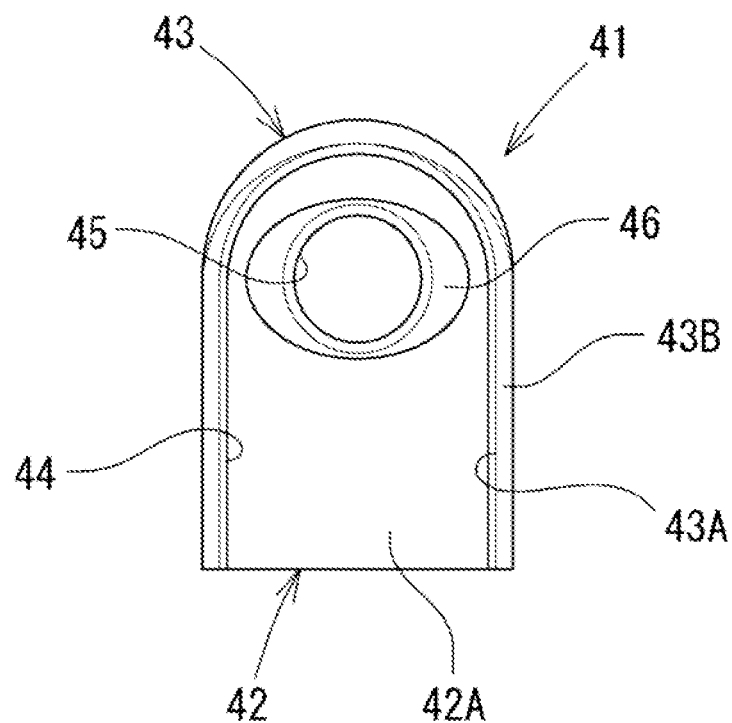
FIG. 4 is an elevation (plan) view of the baffle plate.

According to the present embodiment, the baffle plate 41 is a single-piece component made of a single material. A material used for the baffle plate 41 may be, for example, a flexible NBR (nitrile rubber). The baffle plate 41 includes a thin plate-like contact portion 42 that is bent into an arc along an outer circumferential surface 20A of the middle tube 20. As illustrated in FIG. 4, the contact portion 42 includes a generally semicircular upper part and a generally rectangular lower pare, when viewed from the front thereof (as viewed leftward in FIG. 2). The baffle plate 41 includes a lip 43 (partition wall) that is in contact with an inner circumferential surface of the outer tube 3 so as to encircle the opening 24 when the baffle plate 41 is in a position installed in the reservoir 4. The lip 43 extends into an arch-like shape along the periphery of the contact portion 42. To be more specific, the lip 43 is formed along an edge of the generally semicircular upper part of the contact portion 42 and both right and left edges of the generally rectangular lower part, when viewed from the front as in FIG. 4.

Figure 3:
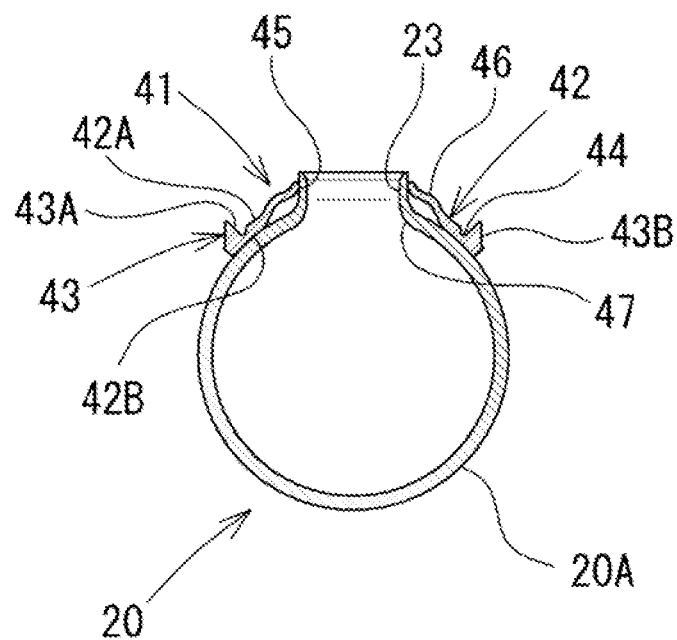
FIG. 3 is a sectional view taken along the line A-A shown in FIG. 2.

As illustrated in FIGS. 2 and 3, the lip 43 has a generally trapezoidal cross-section. The lip 43 includes an inner wall surface 43A extending generally perpendicularly to the contact, portion 42 and therefore the outer circumferential surface 20A of the middle tube 20, and an inclined face 43B making an acute angle with the inner wall surface 43A. The present embodiment provides the baffle plate 41 with a non-contact face 42A in the contact portion 42, and a recess 44 between the non-contact face 42A and the lip 43. The non-contact face 42A is a right-side face of the contact portion 42 in FIG. 2, and an upper face thereof in FIG. 3. In other words, the non-contact face 42A is located on the side where the hydraulic liquid in the reservoir 4 is sealed. The recess 44 is a groove extending along a proximal end of the lip 43, which is located on the inner wall surface 43A side. The recess 44 is formed to reduce the rigidity of the inner wall surface 43A-side proximal end of the lip 43, making the lip 43 easy to deform inwards.

A fitting hole 45 is formed in the center of the upper side of the baffle plate 41 in FIG. 3. The baffle plate 41 is fitted to the connecting pipe 23 with a given interference with the connecting pipe 23 of the middle tube 20 inserted through the fitting hole 45. More particularly, the fitting hole 45 has an inner diameter smaller than an outer diameter of the connecting pipe 23. As illustrated in FIG. 4, a raised portion 46 (thin-wall portion) is provided around the fitting hole 45. The raised portion 46 has the shape of a generally ellipse whose longitudinal axis extends in a horizontal direction when viewed from the front (plan view). As illustrated in FIG. 3, the baffle plate 41 is formed so that the raised portion 46 is smaller (thinner) in board thickness than the contact portion 42, namely, a portion located around the raised portion 46, which is in contact with the middle tubs 20. In this way, the raised portion 46 of the baffle plate 41 is spaced (separated away) from a proximal end of the connecting pipe 23, namely, a curved portion 47 formed between the lateral wall of the middle tube 20 and the connecting pipe 23. This makes it possible to bring the contact portion 42 around the spaced portion (raised portion 46) of the baffle plate 41 into a liquid-tight contact with the outer surface 20A of the middle tubs 20.

Operation of the present embodiment will be now described. The shock absorber 1 is mounted between a sprung member (vehicle body-side member) and an unsprung member (wheel-side member) of a suspension system of a vehicle (that is, between two relatively displaceable members) with the rod guide 8 side facing up and the base valve 10 side facing down.

During an extension stroke of the piston rod 6, the piston 5 in the cylinder 2 moves to close the check valve 13 of the piston 5. Before the disc valve 14 is opened, the hydraulic liquid in the cylinder upper chamber 2A which is pressurized flows through the passage 22 and the annular passage 21, and enters the damping force control mechanism 25 via the interconnecting pipe 30. After being guided through the interconnecting pipe 30 into the damping force control mechanism 25, the hydraulic liquid passes through the main valve 27, the pilot valve 28 and the fail-safe valve 29 to enter the chamber 25A in the casing 26. The hydraulic liquid then flows through the passage 31 and the opening 24 of the outer tube 3 into she reservoir 4.

At this time, the check valve 17 of the base valve 10 is opened, and the hydraulic liquid of an amount corresponding to a distance at which the piston rod 6 moves out of the cylinder 2 is supplied from the reservoir 4 to the cylinder lower chamber 2B. When the pressure in the cylinder upper chamber 2A reaches a valve-opening pressure of the disc valve 14 of the piston 5, the disc valve 14 is opened to relieve the pressure in the cylinder upper chamber 2A to the cylinder lower chamber 2B. This prevents an excessive increase of pressure in the cylinder upper chamber 2A.

During a compression stroke of the piston rod 6, the piston 5 in the cylinder 2 moves to open the check valve 13 of the piston 5 and close the check valve 17 of the base valve 10. Before the disc valve 18 is opened, the hydraulic liquid in the cylinder lower chamber 2B flows into the cylinder upper chamber 2A, and the hydraulic liquid of an amount corresponding to a distance at which the piston rod 6 moves into the cylinder 2 flows from the cylinder upper chamber 2A and passes through the passage 22 and the annular passage 21. The hydraulic liquid is then guided through the interconnecting pipe 30 into the damping force control mechanism 23.

After being guided through the interconnecting pipe 30 into the damping force control mechanism 25, the hydraulic liquid passes through the main valve 27, the pilot valve 28 and a fail-safe valve 23 to enter the chamber 26A in the casing 26. The hydraulic liquid further flows through the passage 31 and the opening 24 of the outer tube 3 into the reservoir 4. When the pressure in the cylinder lower chamber 2B reaches a valve-opening pressure of the disc valve 18 of the base valve 10, the disc valve 18 is opened to relieve the pressure in the cylinder lower chamber 2B to the reservoir 4. This prevents an excessive increase of pressure in the cylinder lower chamber 2B.

As described above, in a range before the main valve 27 is opened (piston's low speed range), a damping force is generated by the pilot valve 28 of the damping force control mechanism 25. In a range after the main valve 27 is opened (piston's high speed range), a damping force according to the opening degree of the main valve 27 is generated. At this time, the damping force can be adjusted by controlling a control current of the solenoid 34 and thus adjusting a controlled pressure of the pilot valve 28. This changes the internal pressure of the back-pressure chamber 32, so that the valve opening pressure and opening degree of the main valve 27 can be adjusted. If the solenoid 34 fails, the fail-safe valve 29 is closed to limit the flow of the hydraulic liquid in place of the pilot valve 28 which is always open. This makes it possible to prevent an excessive decrease of the damping force and maintain a proper amount of the damping force.

The hydraulic liquid that is guided (discharged) from the chamber 26A in the casing 26 through the passage 31 and the opening 24 of the outer tube 3 into the reservoir 4 is sealed in a space surrounded by the arch-shaped lip 43 (partition wall) of the baffle plate 41 (partition member). In particular, the hydraulic liquid that enters the reservoir 4 is secluded from a liquid level S of the hydraulic liquid in the reservoir 4 by the lip 43 of the baffle plate 41, which serves as a partition wall. The hydraulic liquid present inside of the baffle plate 41 in FIG. 4 is discharged into the hydraulic liquid in the reservoir 4 only through a lower end of the baffle plate 41. The baffle place 41, in the position installed in the shock absorber 1, regulates an upward flow of the hydraulic liquid from the opening 24 to an upper portion of the reservoir 4. This prevents a vortex and air bubbles from being created in the vicinity of the liquid level S of the hydraulic liquid in the reservoir 4 due to a jet flow of the hydraulic liquid which enters the reservoir 4 from the opening 24. In the result, aeration and cavitation caused by gas being dissolved in the hydraulic liquid are suppressed, which enables a stable damping force to be provided.

The baffle plate 41 curbs a rapid expansion of flow passage area of the hydraulic liquid that flows from the damping force control mechanism 25 into the reservoir 4. The baffle plate 41 thus suppresses a sharp increase in flow velocity of the hydraulic liquid that enters the reservoir 4. This prevents a vortex from being created, and therefore suppresses the creation of air bubbles and the gas dissolution into the hydraulic liquid, which occur from vortex creation. Aeration and cavitation are consequently suppressed, and a stable damping force can be provided.

The present embodiment has the following advantages. According to the present embodiment, the baffle plate 41 (partition member) is formed by integrally molding a single material containing a flexible NBR (nitrile robber). The baffle plate 41 is fixed (fitted) to the connecting pipe 23 of the middle tube 20 by using the rubber's elastic force produced by enlarging the diameter of the fitting hole 45 of the baffle plate 41. In this way, the baffle plate 41 is installed in the reservoir 4 (middle tube 20) while being in tight contact with the connecting pipe 23. The present embodiment thus eliminates the need for a fixing member for fixing the baffle plats 41 to the middle tube 20, in contrast to shock absorbers in which a baffle plate produced, by cure adhesion of a rubber partition, wall to a press-molded metal plate is fixed to a middle tube (connecting pipe) by means of a fixing member such as a toothed washer. The present embodiment can improve the productivity of baffle plate 41 and therefore that of the shock absorber 1, reducing the production costs thereof.

According to the present embodiment, the baffle plate 41 is liquid-sealingly fitted to the connecting pipe 23 of the middle tube 20 with interference with the connecting pipe 23 inserted through the fitting hole 45. The hydraulic liquid that has flowed through the opening 24 of the outer tube 3 into the reservoir 4 is blocked from entering between the outer circumferential surface 20A of the middle tube 20 and a contact face 42B of the contact portion 42 of the baffle plate 41 through between the connecting pipe 23 and the fitting hole 45. This prevents the aeration that occurs if the hydraulic liquid escapes (spouts) from between the baffle plate 41 and the middle tube 20 (connecting pipe 23). According to the present embodiment, the raised portion 46 (thin-wall portion) is formed between the contact portion 42 and the fitting hole 45 in the baffle plate 41. When the baffle plate 41 is installed, therefore, the fitting hole 45 (contact portion 42) is spaced (separated away) from the curved portion 47 formed in a root area of the connecting pipe 23. This prevents the contact portion 42 from being spaced from the outer circumferential surface 20A of the middle tube 20 by contact of the fitting hole 45 with the curved portion 47.

According to the present embodiment, the baffle plate 41 is provided with the recess 44 formed between the non-contact face 42A of the contact portion 42, which is located on the side where the hydraulic liquid in the reservoir 4 is sealed, and the inner wall surface 43A of the lip 43 (partition wall) (which means that the recess 44 is formed along the proximal end of the lip 43, which is located on the inner wall surface 43A side). The present embodiment thus reduces the rigidity of the inner wall surface 43A-side proximal end of the lip 43 and yet provides the durability and strength required for the lip 43. According to conventional shock absorbers in contrast, when a middle tube attached with a baffle plate is mounted on the inner side of an outer tube, if the rigidity of the lip of the baffle plate is high relative to the size of a space between the outer tube and the middle tube, the outer tube and the middle tube are eccentrically fitted together, resulting in deterioration of assembling performance. In the present embodiment, however, when the middle tube 20 attached with the baffle plate 41 is mounted on the inner side of the outer tube 3, the lip 43 deforms inwards after coming into contact with the inner circumferential surface of the outer tube 3, which facilitates the centering of the outer tube 3 and the middle tube 20. Assembling performance is thus enhanced, improving the productivity of the shock absorber 1. Furthermore, the baffle plate 41 is liquid-sealingly fitted to the connecting pipe 23 of the middle tube 20 with interference with the connecting pipe 23 inserted through the fitting hole 45. This consequently prevents the lifting or displacement (including rotation) of the baffle plate 41, which occurs if the hydraulic liquid enters between the baffle plate 41 and the middle tube 20 through the fitting hole 45.

First Modification Example

Figure 5:
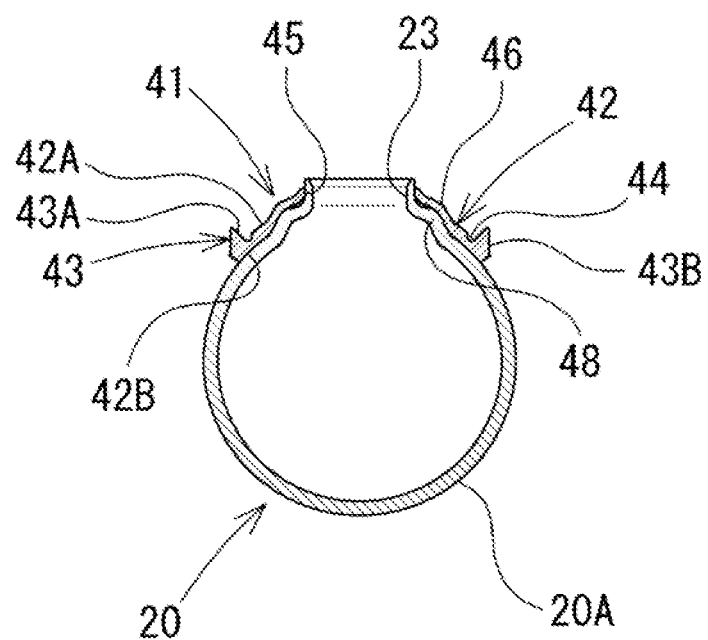
FIG. 5 is an explanatory view of a first modification.

As illustrated in FIG. 5, the baffle plate 41 (partition member) can be applied without change to the middle tube 20 in which a bead 48 is formed in a position coincides with the curved portion 47 (see FIG. 3) of the connecting pipe 23. The bead 48 is provided for mitigating stress concentration. In this case, the baffle plate 41 is configured so that the raised portion 46 may be spaced from the bead 43 of the middle tube 20, which means that the bead 48 of the middle tube 20 is situated under the raised portion 46 of the baffle plate 41.

Second Modification Example

Figure 6:
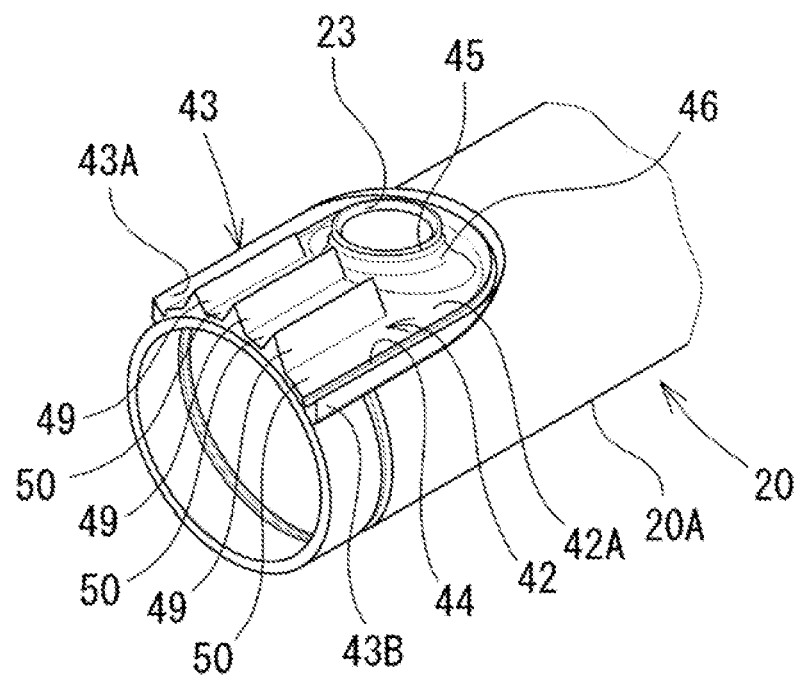
FIG. 6 is an explanatory view of a second modification.

As illustrated in FIG. 6, the non-contact face 42A of the baffle plate 41 (partition member) may be provided with a plurality of (three in FIG. 6) ribs 49 extending in an axial direction (vertical direction in FIG. 1) of the shock absorber 1 and arranged at given intervals in a circumferential direction of the middle tube 20. In this case, there may be provided a channel 50 between the outer tube 3 and the baffle plate 41. The channel 50 is provided for encouraging a smooth downward flow of the hydraulic liquid which enters the reservoir 4 through the opening 24 of the outer tube 3. This makes it possible to obtain a high performance of the damping force control mechanism 25 and therefore the reliability of the shock absorber 1. Contact of the ribs 49 with the inner circumferential surface of the outer tube 3 offers interference to the baffle plate 41, and prevents the displacement (including rotation) of the baffle plate 41. In the second modification including the ribs 49, too, the baffle plate 41 is a single-piece component made of a single material. Although the above-described embodiment has the configuration in which the baffle plate 41 is made only of resin or rubber, the baffle plate 41 may include a core metal in the inside thereof in a partial way.

Although some embodiments of the invention have been described above, these embodiments are for assisting the understanding of the invention and do not limit the invention. Needless to say, the invention may be modified or improved without deviation from, the spirit thereof, and includes ail equivalents thereof. As far as at least part of the foregoing problem can be solved or at least some of the advantages can be provided, the constituent elements mentioned in the claims or the specification may be arbitrarily combined or omitted.

The present application claims priority under Japanese Patent Application No. 2014-146315 filed on Jul. 16, 2014. The entire disclosure of Japanese Patent Application No. 2014-146315 filed on Jul. 16, 2014, including the specification, claims, drawings and abstract, is incorporated herein by reference in its entirety.

What is claimed is:

1. A shock absorber for being installed between two relatively displaceable members, the shock absorber comprising:
   a cylinder in which a hydraulic fluid is sealed;
   a piston inserted in the cylinder;
   a piston rod interconnected to the piston and extending out of the cylinder;
   an outer tube mounted over an outer circumferential surface of the cylinder;
   a reservoir formed between the cylinder and the outer tube and in which the hydraulic liquid and gas are sealed;
   a middle tube mounted between the cylinder and the outer tube;
   a connecting pipe disposed in a lateral wall of the middle tube and including a tip end extending toward the outside of the outer tube;
   an opening formed in the outer tube and allowing the hydraulic liquid to flow from the outside of the outer tube into the reservoir through the outer side of the connecting pipe; and
   a partition member placed within the reservoir, the partition member including a partition wall that, in a state that the shock absorber is located between the two relatively displaceable members, regulates an upward flow of the hydraulic liquid from the opening to an upper portion of the reservoir, wherein
   the partition member is configured as a single integrated structure, the partition member comprising flexible resin or rubber, and
   the partition member is provided with a fitting hole, and fitted, without using a fixing member, to the connecting pipe with interference, so that the connecting pipe is inserted through the fitting hole.

2. The shock absorber according to claim 1, wherein the partition member is made of a single material.

3. The shock absorber according to claim 1, wherein
   the partition member is provided with a contact portion that is formed around the fitting hole and comes into contact with an outer circumferential surface of the middle tube, and
   the partition member is formed so that a portion between the contact portion and the fitting hole is separated away from a proximal end of the connecting pipe.

4. The shock absorber according to claim 1, wherein the partition member includes a thin-wall portion around the fitting hole.

5. The shock absorber according to claim 1, wherein the partition member includes a core metal in the inside thereof.

6. A shock absorber for being installed between two relatively displaceable members, the shock absorber comprising:
   a cylinder in which a hydraulic fluid is sealed;
   a piston inserted in the cylinder;
   a piston rod interconnected to the piston and extending out of the cylinder;
   an outer tube mounted over an outer circumferential surface of the cylinder;
   a reservoir formed between the cylinder and the outer tube and in which the hydraulic liquid and gas are sealed;
   a middle tube mounted between the cylinder and the outer tube;

a connecting pipe disposed in a lateral wall of the middle tube and including a tip end extending toward the outside of the outer tube;

an opening formed in the outer tube for allowing the hydraulic liquid to flow from the outside of the outer tube into the reservoir through the outer side of the connecting pipe; and a partition member placed within the reservoir, the partition member including a partition wall that, in a state that the shock absorber is located between the two relatively displaceable members, regulates an upward flow of the hydraulic liquid from the opening to an upper portion of the reservoir, wherein the partition member is configured as a single integrated structure, the partition member comprising flexible resin or rubber, the partition member is provided with a fitting hole, and fitted to the connecting pipe with the connecting pipe inserted through the fitting hole, and the partition member further includes the partition wall, a recess adjacent to the partition wall, and a surface adjacent to the recess on an opposite side from the partition wall with respect to the recess, each of which is located on an opposite side from the middle tube, the recess being recessed toward a middle tube-side with respect to an end of the surface closer to the recess.

7. The shock absorber according to claim 6, wherein the partition member comprises a plurality of ribs formed integrally with the partition member, the plurality of ribs extending along an axis direction of the shock absorber.

8. The shock absorber according to claim 6, wherein the partition member includes a core metal in the inside thereof.

9. A shock absorber for being installed between two relatively displaceable members, the shock absorber comprising:

a cylinder in which a hydraulic fluid is sealed;

a piston inserted in the cylinder;

a piston rod interconnected to the piston and extending out of the cylinder;

an outer tube mounted over an outer circumferential surface of the cylinder;

a reservoir formed between the cylinder and the outer tube and in which the hydraulic liquid and gas are sealed;

a middle tube mounted between the cylinder and the outer tube;

a connecting pipe disposed in a lateral wall of the middle tube and including a tip end extending toward the outside of the outer tube;

an opening formed in the outer tube and allowing the hydraulic liquid to flow from the outside of the outer tube into the reservoir through the outer side of the connecting pipe; and a partition member placed within the reservoir, the partition member including a partition wall that, in a state that the shock absorber is located between the two relatively displaceable members, regulates an upward flow of the hydraulic liquid from the opening to an upper portion of the reservoir, wherein the partition member is configured as a single integrated structure, the partition member comprising flexible resin or rubber, the partition member is provided with a fitting hole through which the connecting pipe is inserted, and the fitting hole has a diameter smaller than an outer diameter of the connecting pipe with the connecting pipe out of the fitting hole.

10. The shock absorber according to claim 9, wherein the partition member includes a core metal in the inside thereof.

* * * * *